United States Patent
Ly et al.

(10) Patent No.: US 11,777,777 B2
(45) Date of Patent: Oct. 3, 2023

(54) PEAK REDUCTION TONE ALLOCATION

(71) Applicant: QUALCOMM Incorporated, San Diego, CA (US)

(72) Inventors: Hung Dinh Ly, San Diego, CA (US); Saeid Sahraei, San Diego, CA (US); Wei Yang, San Diego, CA (US); Krishna Kiran Mukkavilli, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 17/443,908

(22) Filed: Jul. 28, 2021

(65) Prior Publication Data

US 2022/0038322 A1   Feb. 3, 2022

Related U.S. Application Data

(60) Provisional application No. 62/706,101, filed on Jul. 31, 2020.

(51) Int. Cl.
*H04L 27/26* (2006.01)
*H04W 72/04* (2023.01)
*H04W 80/02* (2009.01)
*H04W 72/044* (2023.01)
*H04W 72/23* (2023.01)

(52) U.S. Cl.
CPC ....... *H04L 27/2614* (2013.01); *H04W 72/044* (2013.01); *H04W 72/23* (2023.01); *H04W 80/02* (2013.01)

(58) Field of Classification Search
CPC ... H04L 5/001; H04L 5/0098; H04L 27/2618; H04L 27/262; H04L 27/2621; H04L 27/2614–2624; H04W 8/02; H04W 72/23; H04W 72/044; H04W 72/2618; H04W 80/02; H04B 2201/70706
See application file for complete search history.

(56) References Cited

U.S. PATENT DOCUMENTS

| | | | |
|---|---|---|---|
| 7,961,591 B2 | 6/2011 | Abedi | |
| 2021/0336758 A1* | 10/2021 | Song | H04L 5/1469 |
| 2022/0022236 A1* | 1/2022 | Li | H04W 52/365 |
| 2022/0039093 A1* | 2/2022 | Ly | H04L 27/2618 |

FOREIGN PATENT DOCUMENTS

| | | | |
|---|---|---|---|
| WO | WO-2020060315 A1 | | 3/2020 |
| WO | WO-2023005731 A1 * | | 2/2023 |

OTHER PUBLICATIONS

English Translation WO 2023/005731 (Year: 2023).*

(Continued)

*Primary Examiner* — Maharishi V Khirodhar
*Assistant Examiner* — Kenneth P Hunt
(74) *Attorney, Agent, or Firm* — Harrity & Harrity LLP

(57) ABSTRACT

Various aspects of the present disclosure generally relate to wireless communication. In some aspects, a user equipment may switch from a first bandwidth part to a second bandwidth part; and transmit a signal including one or more peak reduction tones (PRTs) in one or more locations defined by a PRT allocation for the second bandwidth part. Numerous other aspects are provided.

30 Claims, 7 Drawing Sheets

(56) References Cited

OTHER PUBLICATIONS

International Search Report and Written Opinion—PCT/US2021/071039—ISA/EPO—dated Nov. 16, 2021.
Yu et al., "A Low Complexity Tone Reservation Scheme Based on Time-Domain Kernel Matrix for PAPR Reduction in OFDM Systems," IEEE Transactions on Broadcasting, vol. 61, No. 4, Dec. 2015, pp. 710-716 (7 pages).

* cited by examiner

PEAK REDUCTION TONE ALLOCATION

CROSS-REFERENCE TO RELATED APPLICATION

This patent application claims priority to U.S. Provisional Patent Application No. 62/706,101, filed on Jul. 31, 2020, entitled "PEAK REDUCTION TONE ALLOCATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for peak reduction tone (PRT) allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by an apparatus of a user equipment (UE). The method may include switching from a first bandwidth part to a second bandwidth part. The method may include transmitting a signal including one or more peak reduction tones (PRTs) in one or more locations defined by a PRT allocation for the second bandwidth part.

Some aspects described herein relate to a method of wireless communication performed by a base station. The method may include causing a UE to switch from a first bandwidth part to a second bandwidth part associated with a PRT allocation. The method may include receiving a signal from the UE including one or more PRTs in one or more locations defined by the PRT allocation.

Some aspects described herein relate to a UE for wireless communication. The UE may include a memory and one or more processors coupled to the memory. The one or more processors may be configured to switch from a first bandwidth part to a second bandwidth part. The one or more processors may be configured to transmit a signal including one or more PRTs in one or more locations defined by a PRT allocation for the second bandwidth part.

Some aspects described herein relate to a base station for wireless communication. The base station may include a memory and one or more processors coupled to the memory. The one or more processors may be configured to cause a UE to switch from a first bandwidth part to a second bandwidth part associated with a PRT allocation. The one or more processors may be configured to receive a signal from the UE including one or more PRTs in one or more locations defined by the PRT allocation.

Some aspects described herein relate to a non-transitory computer-readable medium that stores a set of instructions for wireless communication by a UE. The set of instructions, when executed by one or more processors of the UE, may cause the UE to switch from a first bandwidth part to a second bandwidth part. The set of instructions, when executed by one or more processors of the UE, may cause the UE to transmit a signal including one or more PRTs in one or more locations defined by a PRT allocation for the second bandwidth part.

Some aspects described herein relate to a non-transitory computer-readable medium that stores a set of instructions for wireless communication by a base station. The set of instructions, when executed by one or more processors of the base station, may cause the base station to cause a UE to switch from a first bandwidth part to a second bandwidth part associated with a PRT allocation. The set of instructions, when executed by one or more processors of the base station, may cause the base station to receive a signal from the UE including one or more PRTs in one or more locations defined by the PRT allocation.

Some aspects described herein relate to an apparatus for wireless communication. The apparatus may include means for switching from a first bandwidth part to a second bandwidth part. The apparatus may include means for transmitting a signal including one or more PRTs in one or more locations defined by a PRT allocation for the second bandwidth part.

Some aspects described herein relate to an apparatus for wireless communication. The apparatus may include means for causing a UE to switch from a first bandwidth part to a second bandwidth part associated with a PRT allocation. The apparatus may include means for receiving a signal from the UE including one or more PRTs in one or more locations defined by the PRT allocation.

In some aspects, a method of wireless communication performed by a UE includes: switching from a first bandwidth part to a second bandwidth part; determining a PRT allocation for the second bandwidth part; and transmitting a signal including one or more PRTs based at least in part on the PRT allocation.

In some aspects, a method of wireless communication performed by a base station includes: causing a UE to switch from a first bandwidth part to a second bandwidth part; determining a PRT allocation for the second bandwidth part; and receiving a signal from the UE including one or more PRTs based at least in part on the PRT allocation.

In some aspects, a UE for wireless communication includes a memory, and one or more processors coupled to the memory, the memory and the one or more processors configured to: switch from a first bandwidth part to a second bandwidth part; determine a PRT allocation for the second bandwidth part; and transmit a signal including one or more PRTs based at least in part on the PRT allocation.

In some aspects, a base station for wireless communication includes a memory, and one or more processors coupled to the memory, the memory and the one or more processors configured to: cause a UE to switch from a first bandwidth part to a second bandwidth part; determine a PRT allocation for the second bandwidth part; and receive a signal from the UE including one or more PRTs based at least in part on the PRT allocation.

In some aspects, a non-transitory computer-readable medium storing one or more instructions for wireless communication includes one or more instructions that, when executed by one or more processors of a UE, cause the one or more processors to: switch from a first bandwidth part to a second bandwidth part; determine a PRT allocation for the second bandwidth part; and transmit a signal including one or more PRTs based at least in part on the PRT allocation.

In some aspects, a non-transitory computer-readable medium storing one or more instructions for wireless communication includes one or more instructions that, when executed by one or more processors of a base station, cause the one or more processors to: cause a UE to switch from a first bandwidth part to a second bandwidth part; determine a PRT allocation for the second bandwidth part; and receive a signal from the UE including one or more PRTs based at least in part on the PRT allocation.

In some aspects, an apparatus for wireless communication includes: means for switching from a first bandwidth part to a second bandwidth part; means for determining a PRT allocation for the second bandwidth part; and means for transmitting a signal including one or more PRTs based at least in part on the PRT allocation.

In some aspects, an apparatus for wireless communication includes: means for causing a UE to switch from a first bandwidth part to a second bandwidth part; means for determining a PRT allocation for the second bandwidth part; and means for receiving a signal from the UE including one or more PRTs based at least in part on the PRT allocation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
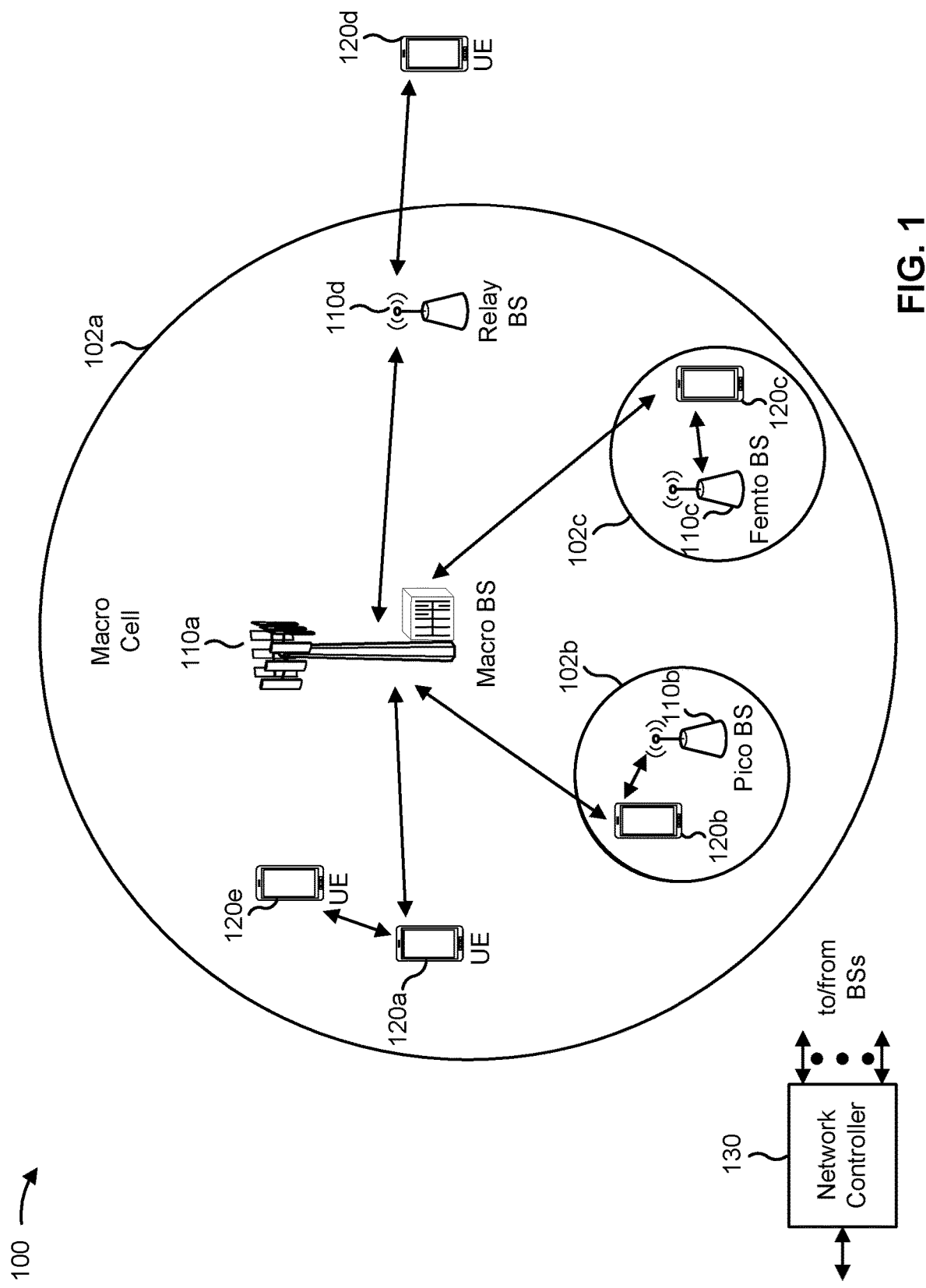
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
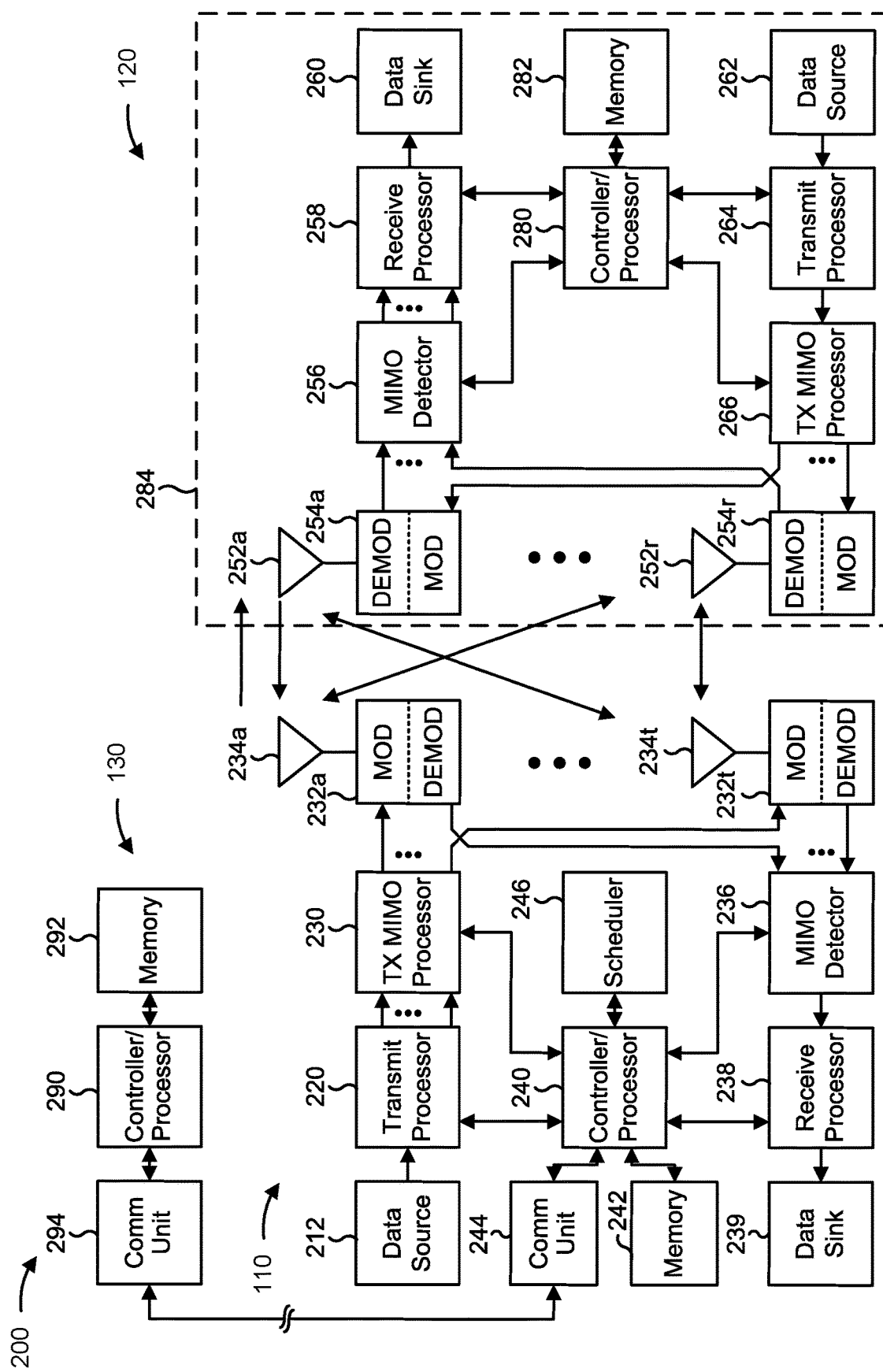
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-7).

Controller/processor 240 of base station 110, controller/processor 280 of UE 120, and/or any other component(s) of FIG. 2 may perform one or more techniques associated with peak reduction tone allocation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for switching from a first bandwidth part to a second bandwidth part; means for determining a peak reduction tone (PRT) allocation for the second bandwidth part; means for transmitting a signal including one or more PRTs based at least in part on the PRT allocation; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for causing a UE to switch from a first bandwidth part to a second bandwidth part; means for determining a PRT allocation for the second bandwidth part; means for receiving a signal from the UE including one or more PRTs based at least in part on the PRT allocation; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE's radio frequency front end (RFFE) may include a power amplifier (PA). A PA may be associated with a maximum input power (sometimes referred to as a saturation point), and may have a non-linear behavior as the maximum input power is approached. For example, the non-linearity may result in increased in-band and out-of-band distortion of an amplified signal and degraded performance (e.g., as quantified by an error vector magnitude (EVM) value and/or the like) at a receiver. In order to reduce or avoid the detrimental effects of the non-linearity of the PA, a UE may operate a PA at a mean input power that is lower than the saturation point. For example, for a signal with a peak-to-average-power ratio (PAPR) of X decibels (dB), a PA may be operated with an input backoff (IBO) of X dB, so that the saturation point of the PA is not reached even at peaks of the signal.

Some transmissions use an orthogonal frequency division multiplexing (OFDM) waveform. OFDM signals are known to suffer from significant PAPR, which grows proportionately with the size of the encoded block. This PAPR issue is exacerbated in 5G/NR, which is associated with higher data rates and therefore larger block size than other RATs such as 4G/LTE. 4G/LTE and 5G/NR provide increased bandwidth in the uplink and the downlink in comparison to some other RATs. This increased bandwidth can be used to reduce the PAPR of an OFDM signal using a technique known as tone reservation. Tone reservation allows a transmitter to utilize one or more otherwise-idle tones to reduce PAPR. For example, the transmitter may determine a magnitude and a phase for a peak reduction tone (PRT) mapped to a reserved tone based at least in part on an OFDM symbol associated with the tone, in order to reduce (e.g., minimize) PAPR. Given that reserved tones and data tones do not overlap, tone reservation may not increase EVM or adjacent channel leakage ratio (ACLR) of the waveform.

A PRT is a tone that is dedicated to reducing the PAPR of the waveform (as compared to a tone that is dedicated to transmitting data). A PRT is generally discarded by a receiver before decoding. A transmitter may design a PAPR-reduction waveform whose support in the frequency domain is limited to the PRTs. The transmitter may add this PAPR-reduction waveform to the data-carrying waveform to reduce PAPR, which reduces PA non-linearity.

While the magnitude and the phase of the reserved tones may be adjusted for each OFDM symbol, an underlying index allocation may be used across multiple different signals. However, the determination of the index allocation uses significant computational resources. Thus, fixing the location of the PRT in advance of a transmission can significantly reduce the complexity of the transmitter, since the optimization does not need be done in real time.

In some aspects, a UE's bandwidth part (BWP) may be switched while the UE is active. For example, a base station may provide downlink control information (DCI) indicating to switch from a source BWP to a target BWP. A BWP is an active communication bandwidth of a UE. In some cases, the UE may switch from a wider BWP to a narrower BWP within the wider BWP, or from a narrower BWP to a wider BWP. In other cases, the UE may switch to a BWP that does not overlap an original BWP of the UE. If the PRT locations of the waveform are configured, for example, via semi-static signaling (e.g., radio resource control (RRC) signaling, medium access control (MAC) signaling, and/or the like), then the PRT locations configured for the UE may fall outside of the target BWP's bandwidth. In this case, the effectiveness of the PRTs may be reduced, for example, due to fewer PRTs falling within the target BWP or due to the distribution of the PRTs within the target BWP being suboptimal.

Some techniques and apparatuses described herein provide for determination of a set of PRT locations (referred to as a PRT allocation) for a target BWP in association with switching to the target BWP. In some aspects, a base station may transmit DCI to the UE based at least in part on triggering a BWP switch of the UE. In some aspects, the base station may configure a PRT sequence for a band (e.g., an operating bandwidth of the UE, a bandwidth of a cell provided by the base station, and/or the like), and the UE may determine a PRT allocation including PRT locations identified by the PRT sequence that fall within the bandwidth of the UE. In some aspects, the base station may configure a PRT sequence for the UE, and the UE may shift the PRT sequence based at least in part on a frequency location of the target BWP so that the PRT locations of the PRT sequence are at least partially within the target BWP. In this way, a UE can determine a PRT allocation for a target BWP, thereby enabling dynamic switching of BWPs without negatively impacting PAPR of signals transmitted or received by the UE. Thus, the UE can operate with a lower D30, thereby increasing coverage and transmission performance of the UE.

Figure 3:
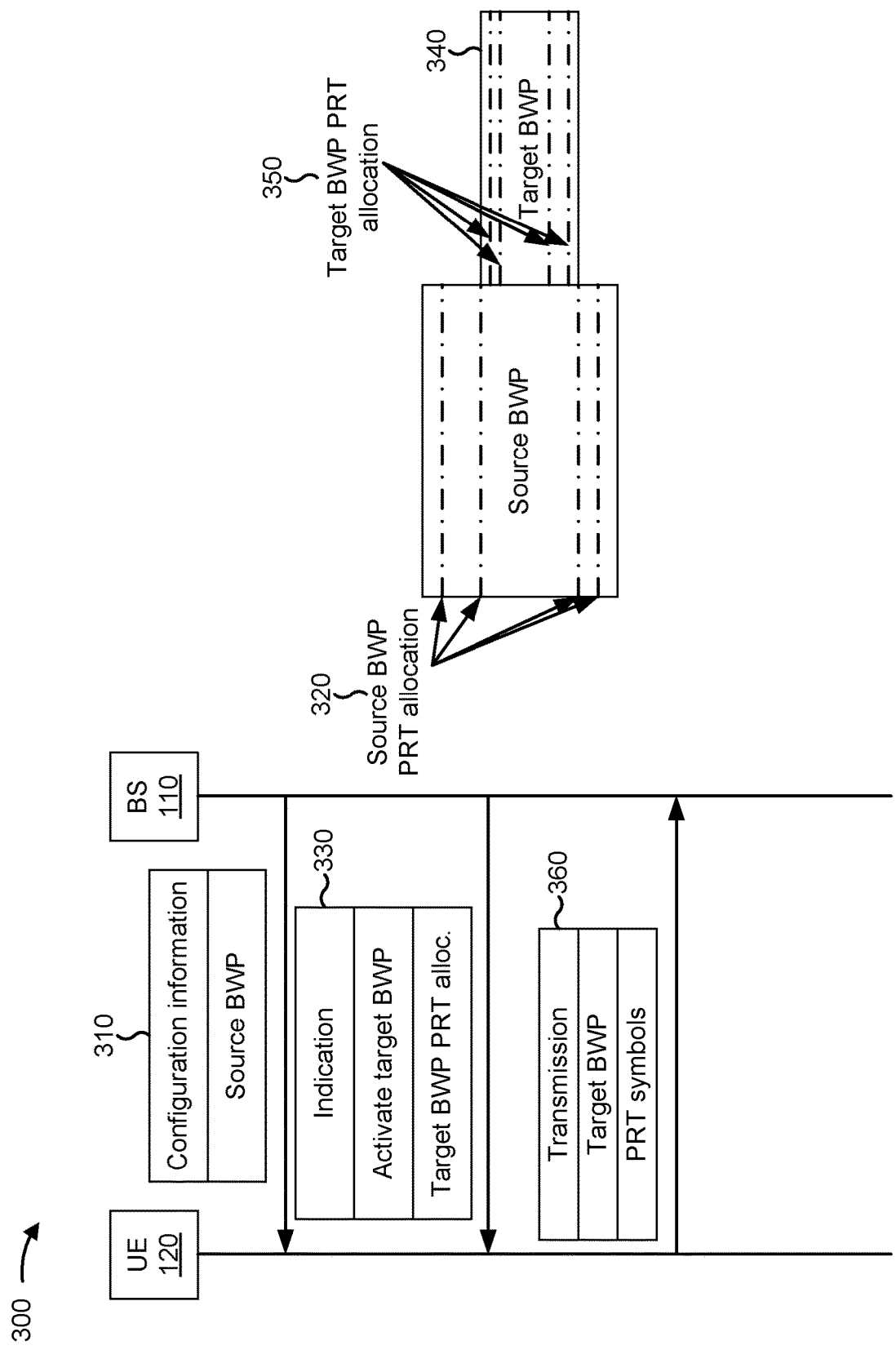
FIGS. 3-5 are diagrams illustrating examples of determination of a PRT allocation for a target bandwidth part (BWP), in accordance with the present disclosure.

FIG. 3 is a diagram illustrating an example 300 of determination of a PRT allocation for a target BWP, in accordance with the present disclosure. As shown, example 300 includes a UE 120 and a BS 110. In example 300, the configuration of a PRT allocation for a target BWP is handled via dynamic signaling, such as DCI.

As shown in FIG. 3, and by reference number 310, the BS 110 may transmit configuration information to the UE 120. The configuration information may include information indicating a set of BWPs for the UE 120, information indicating a PRT allocation associated with the source BWP, and/or the like. As further shown, the UE 120 and the BS 110 may communicate on the source BWP. For example, the configuration information may initially activate the source BWP, or the BS 110 may transmit an indication to activate the source BWP. As shown by reference number 320, the source BWP may include a set of PRTs. The locations of the set of PRTs may be referred to as a PRT allocation, and may be defined by a PRT sequence specified by the BS 110.

As shown by reference number 330, the BS 110 may provide an indication to switch from the source BWP to a target BWP. For example, the BS 110 may trigger or cause the UE 120 to switch from the source BWP to the target BWP. In some aspects, the indication may comprise DCI. For example, the DCI may include a value indicating a BWP, of the set of BWPs configured by the BS 110, to be used as an active BWP of the UE 120. In some aspects, the source BWP may at least partially overlap the target BWP, as shown by reference number 340. For example, the target BWP may have a bandwidth that is a subset of a bandwidth of the source BWP. In other aspects, the source BWP and the target BWP may partially overlap or may not overlap. If the UE 120 were to use the source BWP's PRT allocation for the target BWP (e.g., based at least in part on a semi-static configuration of the PRT sequence), then the PRT locations for the target BWP would fall outside of the bandwidth of the target BWP, thereby degrading PAPR of transmissions of the UE 120. Furthermore, semi-statically updating the PRT sequence of the UE 120 for each BWP switch may be prohibitively resource-intensive and may introduce significant latency.

As further shown, the BS 110 may provide, to the UE 120, information indicating a PRT allocation for the target BWP. The PRT allocation for the target BWP is shown by reference number 350. In some aspects, the information indicating the PRT allocation for the target BWP may include DCI. In some aspects, the DCI may be the same DCI that activates the target BWP. For example, the DCI may indicate the target BWP and may indicate the PRT allocation for the target BWP. In some aspects, the DCI that indicates the PRT allocation may be different than the DCI that activates the target BWP. For example, the BS 110 may provide first DCI activating the target BWP and second DCI indicating the PRT allocation for the target BWP. In such a case, the BS 110 may provide the second DCI based at least in part on providing the first DCI. For example, each time the BWP of the UE 120 changes, the BS 110 may indicate an updated PRT sequence via DCI. In this way, the BS 110 indicates an updated PRT sequence (e.g., a PRT allocation) for a target BWP associated with a BWP switch of a UE 120 via dynamic signaling, such as DCI, which improves PAPR on the target BWP, and which reduces latency and overhead associated with the configuration of the PRT allocation.

As shown by reference number 360, the UE 120 may transmit a transmission on the target BWP including a set of PRT symbols. For example, the UE 120 may determine locations of the set of PRT symbols based at least in part on the PRT allocation. In some aspects, the UE 120 may apply an algorithm to determine values of the set of PRT symbols. One algorithm for determining values of PRTs for a waveform is the signal-to-clipping-noise ratio, tone reservation (SCR-TR) algorithm. The SCR-TR algorithm may receive, as input, the locations of a set of reserved tones, and may output optimized values for the set of reserved tones (e.g., phases and magnitudes) so that PAPR of the resulting OFDM waveform is minimized. As an example of the SCR-TR algorithm, suppose a UE 120 is granted tones $\{1, \ldots, N\}$ for a transmission. Let $\Phi$ be a subset of $\{1, \ldots, N\}$ corresponding to PRT locations identified by a PRT allocation or PRT sequence (e.g., P is the set of reserved tones for PRTs). Thus, the data tones will be allocated to the remaining tones, $\{1, \ldots, N\} \backslash \Phi$. The UE 120 may construct a frequency domain kernel $$P_i = \begin{cases} 1 & \text{if } i \in \Phi \\ 0 & \text{if } i \in [N] \backslash \Phi \end{cases}.$$

The UE 120 may determine an inverse fast Fourier transform (IFFT) of the frequency domain kernel: p=IFFT(P). If X represents frequency-domain data, then $X_i$=0, if i∈Φ. The UE 120 may determine an IFFT of the frequency-domain data: x=IFFT(X). The UE 120 may find a location of the largest peak of x. Let j∈[N] be the index of the largest peak of x. The UE 120 may circularly shift p so that the peaks are aligned: $p^j$=circshift(p,j). The UE 120 may subtract the scaled and shifted p from x to obtain $$x_{new} = x - \frac{|x(j)| - \mu}{p(0)} p^j e^{i \angle x(j)},$$

where μ is the target peak, <x(j) is the phase of x(j), and i= $\sqrt{-1}$. The UE 120 may iterate the above algorithm one or more times to reduce several peaks. Thus, the UE 120 may apply the SCR-TR algorithm to reduce PAPR of an OFDM waveform including reserved tones, such as an OFDM waveform for the transmission shown by reference number 360.

As indicated above, FIG. 3 is provided as an example. Other examples may differ from what is described with regard to FIG. 3.

Figure 4:
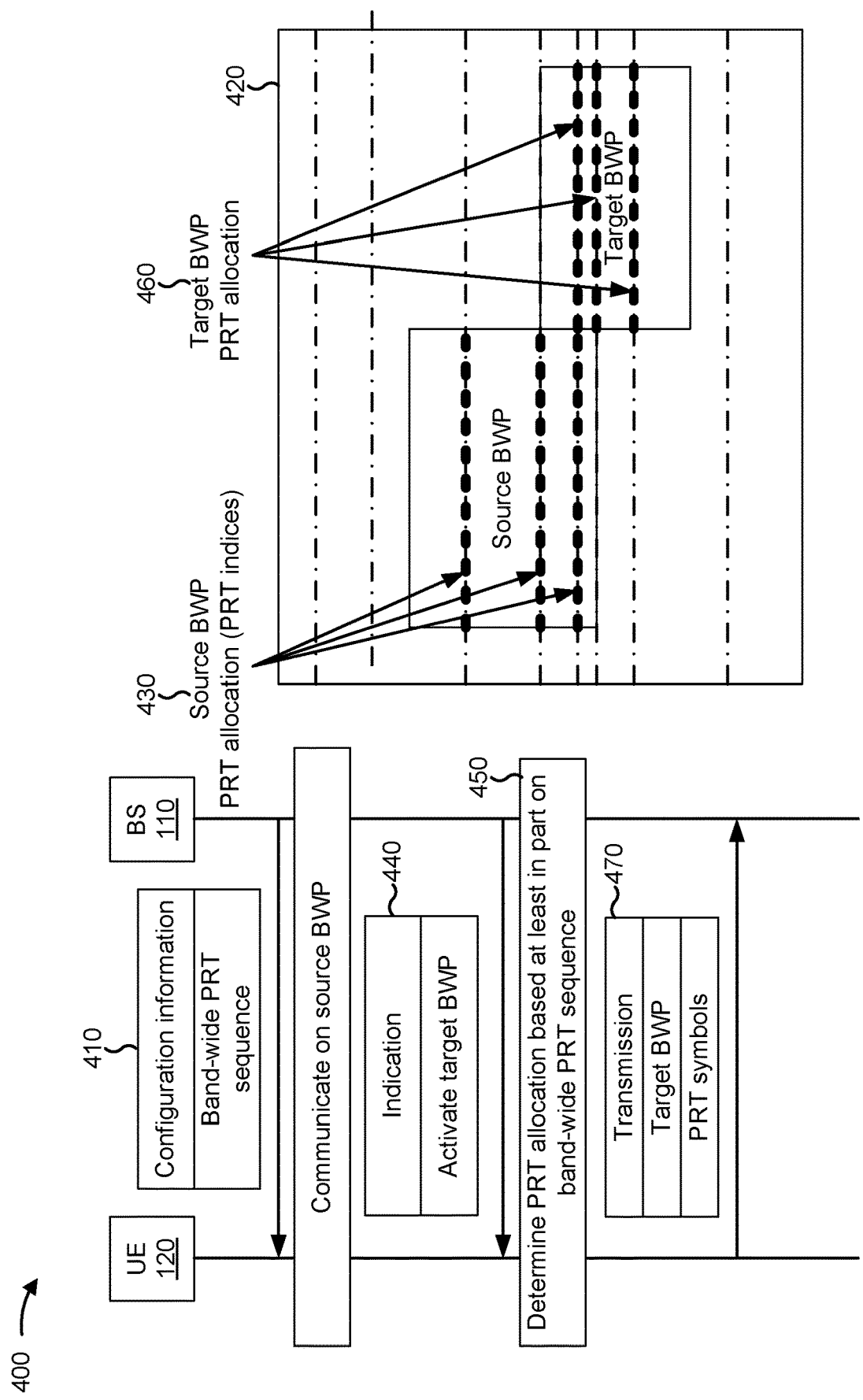

FIG. 4 is a diagram illustrating an example 400 of determination of a PRT allocation for a target BWP, in accordance with the present disclosure. As shown, example 400 includes a UE 120 and a BS 110. In example 400, the BS 110 configures a band-wide PRT sequence and the UE 120 determines a PRT allocation based at least in part on the band-wide PRT sequence.

As shown in FIG. 4, and by reference number 410, the BS 110 may transmit configuration information to the UE 120. In some aspects, the configuration information may configure a set of BWPs, as described in more detail in connection with reference number 310 of FIG. 3. As shown, the configuration information may indicate a band-wide PRT sequence. An example of a band-wide PRT sequence is shown by reference number 420. "Band-wide PRT sequence" may refer to a PRT sequence that spans an operating bandwidth of the UE 120, a PRT sequence that spans an operating bandwidth of the BS 110, a PRT sequence that spans a band (e.g., an LTE band, an NR band, and/or the like), and/or the like. In some aspects, a band-wide PRT sequence may span less than an operating bandwidth of the UE 120 or the BS 110. For example, the PRT sequence may span a bandwidth of a band that is a proper subset of the band. In some aspects, multiple different PRT sequences may be configured in different regions of a band. The configuration information indicating the band-wide PRT sequence may be provided via RRC signaling, MAC signaling, and/or the like.

As shown, the UE 120 may communicate with the BS 110 on the source BWP. For example, the UE 120 may use a PRT allocation determined based at least in part on the band-wide PRT sequence to transmit a set of PRTs in a communication with the BS 110. The PRT allocation for the source BWP is shown by reference number 430. Generally, a PRT allocation for a given BWP is indicated by a line with a thicker line weight than the line weight used for the band-wide PRT sequence. The UE 120 and the BS 110 may determine the PRT allocation based at least in part on PRT locations, indicated by the band-wide PRT sequence, that intersect with a bandwidth of the source BWP. For example, the UE 120 and the BS 110 may use PRTs that fall within the allocated BWP. Generally, a reference herein to a PRT identified by a PRT sequence can refer to a PRT index identified by the PRT sequence. For example, the PRT sequence may identify a set of PRT indices and PRT locations associated with PRTs of the set of PRT indices. In some aspects, a PRT index may be referred to as a PRT occasion.

As shown by reference number 440, the BS 110 may provide an indication to switch from the source BWP to a target BWP. For example, the BS 110 may trigger or cause the UE 120 to switch from the source BWP to the target BWP. In some aspects, the indication may comprise DCI. For example, the DCI may include a value indicating a BWP, of the set of BWPs configured by the BS 110, to be used as an active BWP of the UE 120. In some aspects, the source BWP may at least partially overlap the target BWP, as shown in FIG. 4. In other aspects, the source BWP and the target BWP may not overlap. If the UE 120 were to use the source BWP's PRT allocation for the target BWP, then the PRT locations for the target BWP would fall outside of the bandwidth of the target BWP, thereby degrading PAPR of transmissions of the UE 120. Furthermore, semi-statically updating the PRT sequence of the UE 120 for each BWP switch may be prohibitively resource-intensive and may introduce significant latency.

As shown by reference number 450, the UE 120 and the BS 110 may determine a PRT allocation for the target BWP. The determined PRT allocation is shown by reference number 460. As shown, the PRT allocation for the target BWP includes PRTs that are within the bandwidth of the target BWP. Thus, the UE 120 and the BS 110 determine a PRT allocation for a BWP without explicit indication of the PRT allocation for the BWP, which reduces overhead associated with explicitly indicating the PRT allocation. In some aspects, explicitly indicating the PRT allocation (as described, for example, in connection with FIG. 3) may provide increased flexibility for PRT configuration, which may further reduce PAPR on the target BWP. As shown by reference number 470, the UE 120 may transmit a signal on the target BWP including a set of PRT symbols. For example, the UE 120 may determine locations of the set of PRT symbols based at least in part on the PRT allocation. The generation of the signal including the set of PRT symbols is described in more detail in connection with FIG. 3.

As indicated above, FIG. 4 is provided as an example. Other examples may differ from what is described with regard to FIG. 4.

Figure 5:
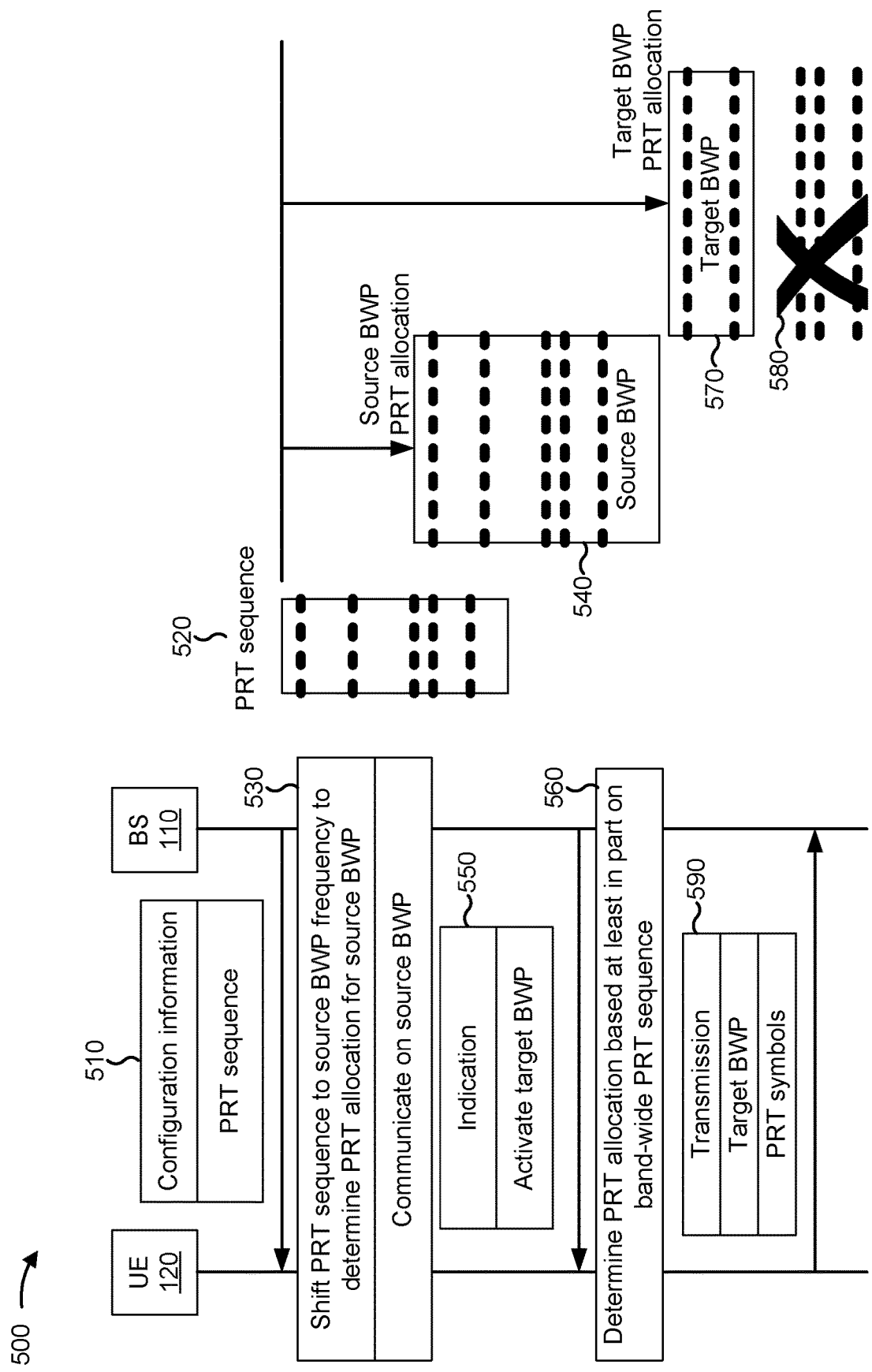

FIG. 5 is a diagram illustrating an example 500 of determination of a PRT allocation for a target BWP, in accordance with the present disclosure. As shown, example 500 includes a UE 120 and a BS 110. In example 500, the BS 110 configures a PRT sequence and the UE 120 shifts or offsets the PRT sequence to a frequency associated with an active BWP of the UE 120.

As shown in FIG. 5, and by reference number 510, the BS 110 may transmit configuration information to the UE 120. In some aspects, the configuration information may configure a set of BWPs, as described in more detail in connection with reference number 310 of FIG. 3. As shown, the configuration information may indicate a PRT sequence. An example of a PRT sequence is shown by reference number 520. The PRT sequence of example 500 may span less than a band (e.g., may not be a band-wide PRT sequence as described in connection with FIG. 4).

In some aspects, the configuration information may indicate a plurality of PRT sequences (e.g., via RRC or MAC signaling). For example, the plurality of PRT sequences may be associated with BWPs configured for the UE 120. In some aspects, the plurality of PRT sequences may have a one-to-one relationship with BWPs (e.g., each PRT sequence, of the plurality of PRT sequences, may be mapped to a corresponding BWP configured for the UE 120). In some aspects, the plurality of PRTs may have a one-to-many relationship with BWPs (e.g., a PRT sequence may be mapped to multiple BWPs), a many-to-one relationship with BWPs (e.g., multiple PRT sequences may be mapped to a BWP), or a many-to-many relationship with BWPs (e.g., multiple PRT sequences may be mapped to multiple BWPs).

As shown by reference number 530, the UE 120 may determine a PRT allocation for the source BWP. The PRT allocation for the source BWP is shown by reference number 540. For example, the UE 120 and/or the BS 110 may apply a shift or offset to the PRT sequence shown by reference number 520 so that the PRT sequence is aligned with the source BWP, and may determine the PRT allocation based at least in part on the PRT sequence. In some aspects, the UE 120 and the BS 110 may apply the shift so that the PRT sequence starts at a first tone or a first resource block of the BWP. As further shown, the UE 120 and the BS 110 may communicate on the source BWP (e.g., using the PRT allocation determined in connection with reference number 530).

In some aspects, if the configuration information indicates a plurality of PRT sequences, the UE 120 may determine the PRT allocation for the source BWP based at least in part on a PRT sequence, of the plurality of PRT sequences, that is configured as corresponding to the source BWP.

As shown by reference number 550, the BS 110 may provide an indication to switch from the source BWP to a target BWP. For example, the BS 110 may trigger or cause the UE 120 to activate target BWP. As shown by reference number 560, the UE 120 and the BS 110 may determine a PRT allocation for the target BWP. The determined PRT allocation is shown by reference number 570. For example, the UE 120 and/or the BS 110 may apply a shift or offset to the PRT sequence shown by reference number 520 so that the PRT sequence is aligned with the target BWP, and may determine the PRT allocation based at least in part on the PRT sequence. As shown, the PRT allocation for the target BWP includes PRTs that are within the bandwidth of the target BWP. For example, as shown by reference number 580, the PRTs of the PRT sequence that fall outside of the bandwidth of the target BWP may not be used. In some aspects, if the BS 110 erroneously configures a subset of the allocated PRTs to fall outside of the BWP, the UE 120 may determine whether to use the subset of the allocated PRTs based at least in part on a capability of the UE 120. For example, if the UE 120 can utilize a bandwidth including the BWP and the subset of the allocated PRTs, the UE 120 may use the subset of the allocated PRTs.

In some aspects, if the configuration information indicates a plurality of PRT sequences, the UE 120 may determine the PRT allocation for the target BWP based at least in part on a PRT sequence, of the plurality of PRT sequences, that is configured as corresponding to the target BWP.

As shown by reference number 590, the UE 120 may transmit a transmission on the target BWP including a set of PRT symbols. For example, the UE 120 may determine locations of the set of PRT symbols based at least in part on the PRT allocation. The generation of the transmission including the set of PRT symbols is described in more detail in connection with FIG. 3.

In this way, the UE 120 and the BS 110 can determine a PRT allocation for a BWP based at least in part on a PRT sequence that spans less than all of the operating band of the UE 120 or the BS 110. The PRT sequence of example 500 may use less overhead than the PRT sequence of example 400, whereas the PRT sequence of example 400 may involve less computational complexity than the PRT sequence of example 500.

As indicated above, FIG. 5 is provided as an example. Other examples may differ from what is described with regard to FIG. 5.

Figure 6:
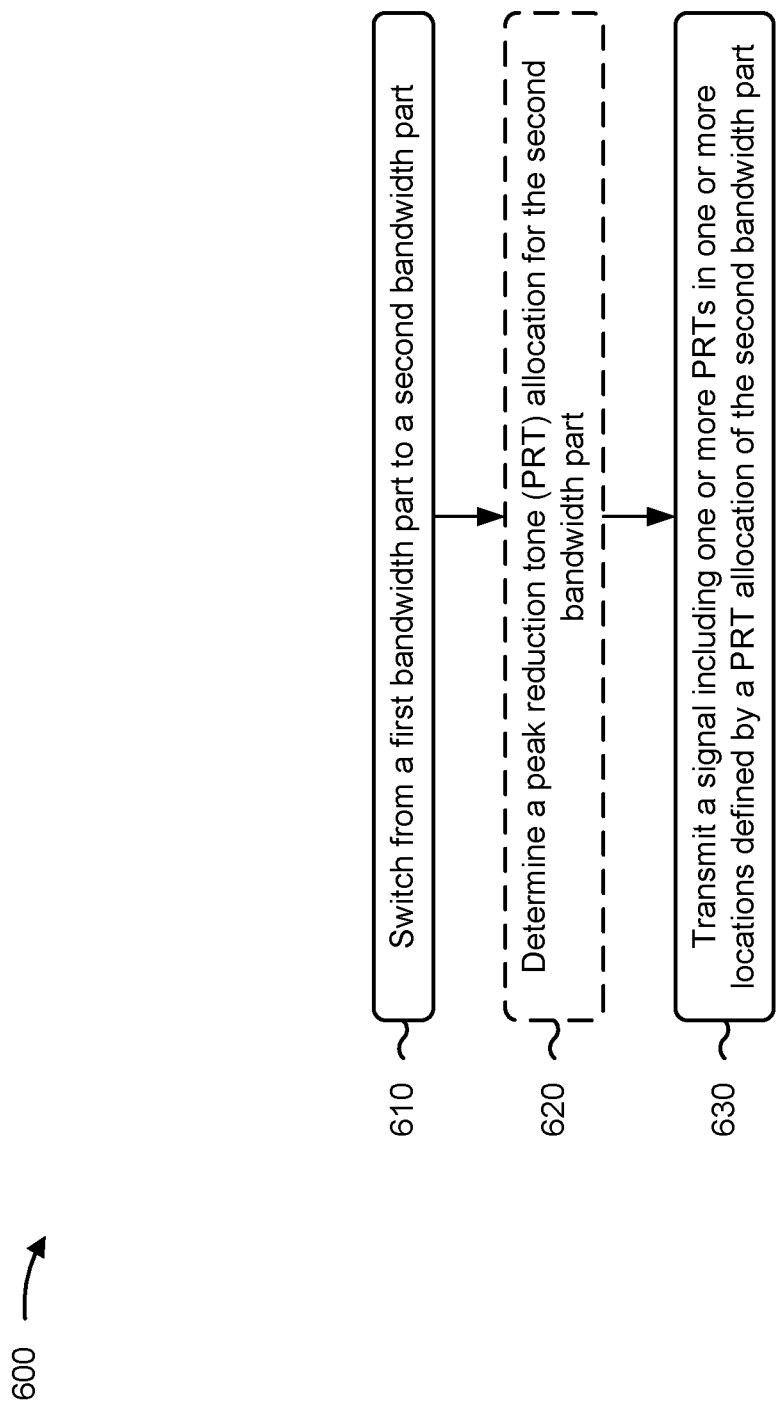
FIGS. 6-7 are diagrams illustrating example processes associated with PRT allocation, in accordance with the present disclosure.

FIG. 6 is a diagram illustrating an example process 600 performed, for example, by a UE, in accordance with the present disclosure. Example process 600 is an example where the UE (e.g., UE 120) performs operations associated with PRT allocation.

As shown in FIG. 6, in some aspects, process 600 may include switching from a first bandwidth part to a second bandwidth part (block 610). For example, the UE (e.g., using antenna 252, demodulator 254, MIMO detector 256, receive processor 258, transmit processor 264, TX MIMO processor 266, modulator 254, controller/processor 280, and/or memory 282) may switch from a first bandwidth part to a second bandwidth part, as described above.

As further shown in FIG. 6, in some aspects, process 600 may include determining a PRT allocation for the second bandwidth part (block 620). For example, the UE (e.g., using antenna 252, demodulator 254, MIMO detector 256, receive processor 258, transmit processor 264, TX MIMO processor 266, modulator 254, controller/processor 280, and/or memory 282) may determine a PRT allocation for the second bandwidth part, as described above.

As further shown in FIG. 6, in some aspects, process 600 may include transmitting a signal including one or more PRTs in one or more locations defined by a PRT allocation of the second bandwidth part (block 630). For example, the UE (e.g., using antenna 252, transmit processor 264, TX MIMO processor 266, modulator 254, controller/processor 280, and/or memory 282) may transmit a signal including one or more PRTs based at least in part on the PRT allocation, as described above. The one or more PRTs may be in one or more locations (e.g., PRT locations) defined by the PRT allocation.

Process 600 may include additional aspects, such as any single aspect or any combination of aspects described below and/or in connection with one or more other processes described elsewhere herein.

In a first aspect, determining the PRT allocation is based at least in part on receiving downlink control information indicating to switch to the second bandwidth part.

In a second aspect, alone or in combination with the first aspect, process 600 includes determining (e.g., using antenna 252, DEMOD 254, MIMO detector 256, receive processor 258, controller/processor 280, and/or the like) PRT allocation based at least in part on the downlink control information.

In a third aspect, alone or in combination with one or more of the first and second aspects, the downlink control information indicates the PRT allocation and to switch from the first bandwidth part to the second bandwidth part.

In a fourth aspect, alone or in combination with one or more of the first through third aspects, the downlink control information is first downlink control information, and process 600 further comprises receiving (e.g., using antenna 252, DEMOD 254, MIMO detector 256, receive processor 258, controller/processor 280, and/or the like) second downlink control information indicating to switch from the first bandwidth part to the second bandwidth part.

In a fifth aspect, alone or in combination with one or more of the first through fourth aspects, the PRT allocation is based at least in part on a PRT sequence that is configured for an operating band of the UE.

In a sixth aspect, alone or in combination with one or more of the first through fifth aspects, the PRT sequence spans an entirety of the operating band.

In a seventh aspect, alone or in combination with one or more of the first through sixth aspects, the PRT sequence is configured via radio resource control signaling or medium access control signaling.

In an eighth aspect, alone or in combination with one or more of the first through seventh aspects, process 600 further comprises determining the PRT allocation based at least in part on a set of PRT indices, identified by the PRT sequence, that are included in a bandwidth of the second bandwidth part.

In a ninth aspect, alone or in combination with one or more of the first through eighth aspects, the PRT allocation is based at least in part on a PRT sequence that is shifted to a frequency associated with the second bandwidth part.

In a tenth aspect, alone or in combination with one or more of the first through ninth aspects, the PRT sequence is configured via radio resource control signaling or medium access control signaling prior to the UE switching from the first bandwidth part to the second bandwidth part.

In an eleventh aspect, alone or in combination with one or more of the first through tenth aspects, the PRT sequence is shifted to a first tone or a first resource block of the second bandwidth part.

In a twelfth aspect, alone or in combination with one or more of the first through eleventh aspects, one or more PRT indices, identified by the PRT sequence, are outside of a bandwidth of the second bandwidth part, and the PRT allocation for the second bandwidth part excludes the one or more PRT indices.

In a thirteenth aspect, alone or in combination with one or more of the first through twelfth aspects, one or more PRT indices, identified by the PRT sequence, are outside of a bandwidth of the second bandwidth part, and process 600 further comprises determining whether to include the one or more PRT indices in the PRT allocation.

In a fourteenth aspect, alone or in combination with one or more of the first through thirteenth aspects, process 600 includes receiving configuration information indicating a plurality of PRT sequences associated with a plurality of bandwidth parts, wherein the plurality of bandwidth parts includes the second bandwidth part, and wherein the PRT allocation for the second bandwidth part is based at least in part on a PRT sequence, of the plurality of PRT sequences, associated with the second bandwidth part.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
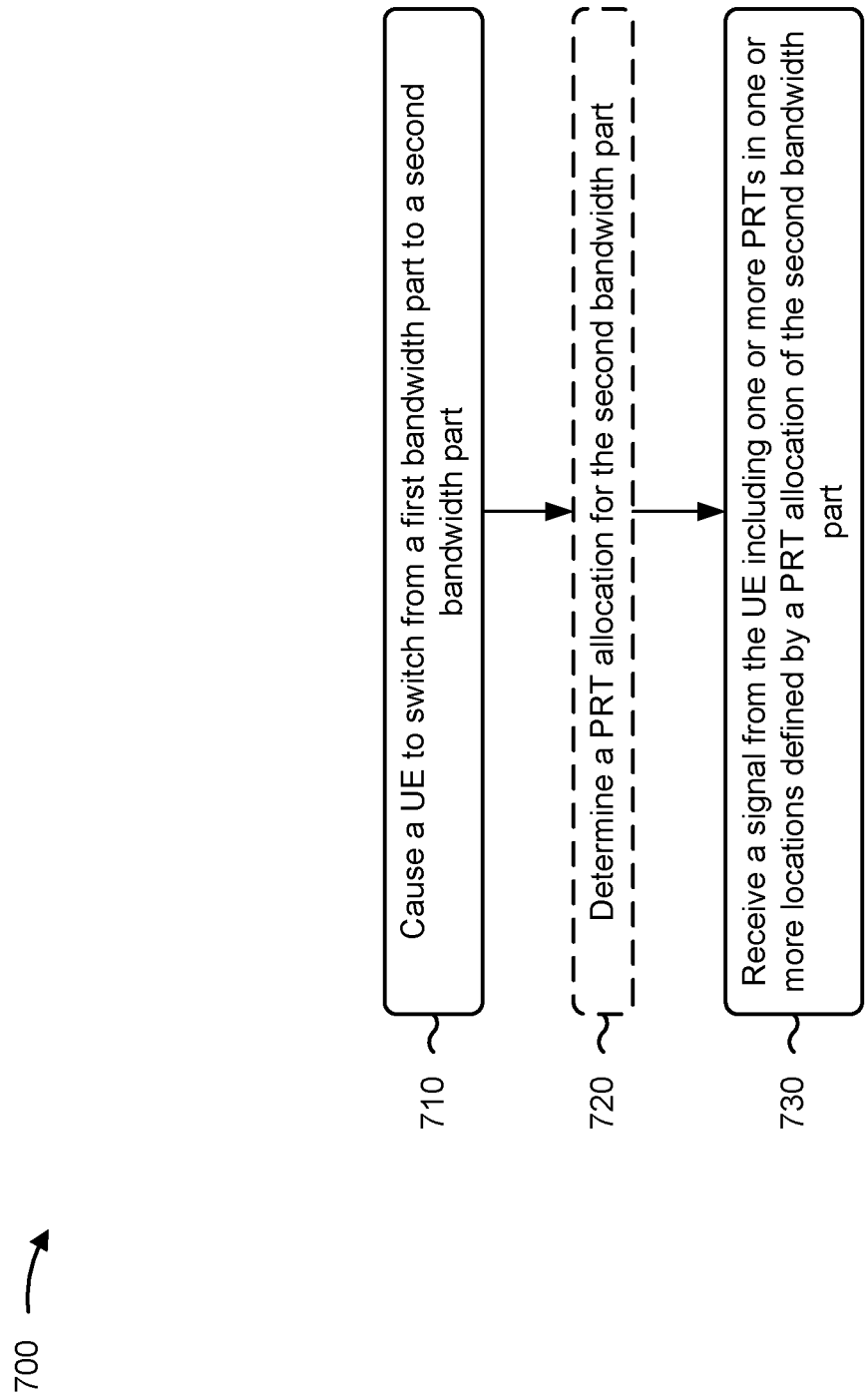

FIG. 7 is a diagram illustrating an example process 700 performed, for example, by a base station, in accordance with the present disclosure. Example process 700 is an example where the base station (e.g., base station 110) performs operations associated with PRT allocation.

As shown in FIG. 7, in some aspects, process 700 may include causing a UE to switch from a first bandwidth part to a second bandwidth part associated with a PRT allocation (block 710). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may cause a UE to switch from a first bandwidth part to a second bandwidth part, as described above. The second bandwidth part may be associated with a PRT allocation.

As further shown in FIG. 7, in some aspects, process 700 may include determining a PRT allocation for the second bandwidth part (block 720). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may determine a PRT allocation for the second bandwidth part, as described above.

As further shown in FIG. 7, in some aspects, process 700 may include receiving a signal from the UE including one or more PRTs based at least in part on the PRT allocation (block 730). For example, the base station (e.g., using antenna 234, demodulator 232, MIMO detector 236, receive processor 238, controller/processor 240, and/or memory 242) may receive a signal from the UE including one or more PRTs based at least in part on the PRT allocation, as described above. The one or more PRTs may be in one or more locations defined by the PRT allocation.

Process 700 may include additional aspects, such as any single aspect or any combination of aspects described below and/or in connection with one or more other processes described elsewhere herein.

In a first aspect, process 700 includes transmitting downlink control information indicating the PRT allocation for the second bandwidth part.

In a second aspect, alone or in combination with the first aspect, process 700 includes transmitting the downlink control information in association with causing the UE to switch from the first bandwidth part to the second bandwidth part.

In a third aspect, alone or in combination with one or more of the first and second aspects, the downlink control information indicates the PRT allocation and to switch from the first bandwidth part to the second bandwidth part.

In a fourth aspect, alone or in combination with one or more of the first through third aspects, the downlink control information is first downlink control information, and process 700 further comprises transmitting second downlink control information indicating to switch from the first bandwidth part to the second bandwidth part.

In a fifth aspect, alone or in combination with one or more of the first through fourth aspects, process 700 includes configuring a PRT sequence for an operating band of the UE, wherein determining the PRT allocation is based at least in part on the PRT sequence.

In a sixth aspect, alone or in combination with one or more of the first through fifth aspects, the PRT sequence spans an entirety of the operating band.

In a seventh aspect, alone or in combination with one or more of the first through sixth aspects, the PRT sequence is configured via radio resource control signaling or medium access control signaling.

In an eighth aspect, alone or in combination with one or more of the first through seventh aspects, the PRT allocation is based at least in part on a set of PRT indices, identified by the PRT sequence, that are included in a bandwidth of the second bandwidth part.

In a ninth aspect, alone or in combination with one or more of the first through eighth aspects, determining the PRT allocation is based at least in part on a PRT sequence that is shifted to a frequency associated with the second bandwidth part.

In a tenth aspect, alone or in combination with one or more of the first through ninth aspects, process 700 includes configuring the PRT sequence via radio resource control signaling or medium access control signaling prior to the UE switching from the first bandwidth part to the second bandwidth part.

In an eleventh aspect, alone or in combination with one or more of the first through tenth aspects, the PRT sequence is shifted to a first tone or a first resource block of the second bandwidth part.

In a twelfth aspect, alone or in combination with one or more of the first through eleventh aspects, one or more PRT indices, identified by the PRT sequence, are outside of a bandwidth of the second bandwidth part, and the PRT allocation for the second bandwidth part excludes the one or more PRT indices.

In a thirteenth aspect, alone or in combination with one or more of the first through twelfth aspects, process 700 includes transmitting configuration information indicating a plurality of PRT sequences associated with a plurality of bandwidth parts, wherein the plurality of bandwidth parts includes the second bandwidth part, wherein the PRT allocation for the second bandwidth part is based at least in part on a PRT sequence, of the plurality of PRT sequences, associated with the second bandwidth part.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by an apparatus of a user equipment (UE), comprising: switching from a first bandwidth part to a second bandwidth part; and transmitting a signal including one or more peak reduction tones (PRTs) in one or more locations defined by a PRT allocation for the second bandwidth part.

Aspect 2: The method of Aspect 1, further comprising: receiving downlink control information indicating to switch to the second bandwidth part.

Aspect 3: The method of Aspect 2, further comprising: determining the PRT allocation based at least in part on the downlink control information.

Aspect 4: The method of any of Aspects 1-3, wherein the PRT allocation is based at least in part on a PRT sequence that is configured for an operating band of the UE.

Aspect 5: The method of Aspect 4, wherein the PRT sequence spans an entirety of the operating band.

Aspect 6: The method of Aspect 4, wherein the PRT sequence is configured via radio resource control signaling or medium access control signaling.

Aspect 7: The method of Aspect 4, further comprising: determining the PRT allocation based at least in part on a set of PRT indices, identified by the PRT sequence, that are included in a bandwidth of the second bandwidth part.

Aspect 8: The method of any of Aspects 1-7, wherein the PRT allocation is based at least in part on a PRT sequence that is shifted to a frequency associated with the second bandwidth part.

Aspect 9: The method of Aspect 8, wherein the PRT sequence is configured via radio resource control signaling or medium access control signaling prior to the UE switching from the first bandwidth part to the second bandwidth part.

Aspect 10: The method of Aspect 8, wherein the PRT sequence is shifted to a first tone or a first resource block of the second bandwidth part.

Aspect 11: The method of Aspect 8, wherein one or more PRT indices, identified by the PRT sequence, are outside of a bandwidth of the second bandwidth part, and wherein the PRT allocation for the second bandwidth part excludes the one or more PRT indices.

Aspect 12: The method of Aspect 8, wherein one or more PRT indices, identified by the PRT sequence, are outside of a bandwidth of the second bandwidth part, and wherein the method further comprises: determining whether to include the one or more PRT indices in the PRT allocation.

Aspect 13: The method of any of Aspects 1-12, further comprising: receiving configuration information indicating a plurality of PRT sequences associated with a plurality of bandwidth parts, wherein the plurality of bandwidth parts includes the second bandwidth part, and wherein the PRT allocation for the second bandwidth part is based at least in part on a PRT sequence, of the plurality of PRT sequences, associated with the second bandwidth part.

Aspect 14: A method of wireless communication performed by an apparatus of a base station, comprising: causing a user equipment (UE) to switch from a first bandwidth part to a second bandwidth part associated with a peak reduction tone (PRT) allocation; and receiving a signal from the UE including one or more PRTs in one or more locations defined by the PRT allocation.

Aspect 15: The method of Aspect 14, further comprising: transmitting downlink control information indicating the PRT allocation for the second bandwidth part.

Aspect 16: The method of Aspect 15, wherein the downlink control information is first downlink control information, and wherein the method further comprises: transmitting second downlink control information indicating to switch from the first bandwidth part to the second bandwidth part.

Aspect 17: The method of any of Aspects 14-16, further comprising: configuring a PRT sequence for an operating band of the UE, wherein determining the PRT allocation is based at least in part on the PRT sequence.

Aspect 18: The method of Aspect 17, wherein the PRT sequence spans an entirety of the operating band.

Aspect 19: The method of Aspect 17, wherein the PRT allocation is based at least in part on a set of PRT indices, identified by the PRT sequence, that are included in a bandwidth of the second bandwidth part.

Aspect 20: The method of any of Aspects 14-19, wherein the PRT allocation is based at least in part on a PRT sequence that is shifted to a frequency associated with the second bandwidth part.

Aspect 21: The method of Aspect 20, further comprising: configuring the PRT sequence via radio resource control signaling or medium access control signaling prior to the UE switching from the first bandwidth part to the second bandwidth part.

Aspect 22: The method of Aspect 20, wherein the PRT sequence is shifted to a first tone or a first resource block of the second bandwidth part.

Aspect 23: The method of Aspect 22, wherein one or more PRT indices, identified by the PRT sequence, are outside of a bandwidth of the second bandwidth part, and wherein the PRT allocation for the second bandwidth part excludes the one or more PRT indices.

Aspect 24: The method of any of Aspects 14-23, further comprising: transmitting configuration information indicating a plurality of PRT sequences associated with a plurality of bandwidth parts, wherein the plurality of bandwidth parts includes the second bandwidth part, and wherein the PRT allocation for the second bandwidth part is based at least in part on a PRT sequence, of the plurality of PRT sequences, associated with the second bandwidth part.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
 a memory; and
 one or more processors, coupled to the memory, configured to:
  switch from a first bandwidth part to a second bandwidth part; and
  transmit a signal including one or more peak reduction tones (PRTs) in one or more locations defined by a PRT allocation for the second bandwidth part.

2. The apparatus of claim 1, wherein the one or more processors are further configured to:
 receive downlink control information indicating to switch to the second bandwidth part.

3. The apparatus of claim 2, wherein the one or more processors are further configured to:
 determine the PRT allocation based at least in part on the downlink control information.

4. The apparatus of claim 1, wherein the PRT allocation is based at least in part on a PRT sequence that is configured for an operating band of the UE.

5. The apparatus of claim 4, wherein the PRT sequence spans an entirety of the operating band.

6. The apparatus of claim 4, wherein the PRT sequence is configured via radio resource control signaling or medium access control signaling.

7. The apparatus of claim 4, wherein the one or more processors are further configured to:
 determine the PRT allocation based at least in part on a set of PRT indices, identified by the PRT sequence, that are included in a bandwidth of the second bandwidth part.

8. The apparatus of claim 1, wherein the PRT allocation is based at least in part on a PRT sequence that is shifted to a frequency associated with the second bandwidth part.

9. The apparatus of claim 8, wherein the PRT sequence is configured via radio resource control signaling or medium access control signaling prior to the UE switching from the first bandwidth part to the second bandwidth part.

10. The apparatus of claim 8, wherein the PRT sequence is shifted to a first tone or a first resource block of the second bandwidth part.

11. The apparatus of claim 8, wherein one or more PRT indices, identified by the PRT sequence, are outside of a bandwidth of the second bandwidth part, and wherein the PRT allocation for the second bandwidth part excludes the one or more PRT indices.

12. The apparatus of claim 8, wherein one or more PRT indices, identified by the PRT sequence, are outside of a bandwidth of the second bandwidth part, and wherein the one or more processors are further configured to:
 determine whether to include the one or more PRT indices in the PRT allocation.

13. The apparatus of claim 1, wherein the one or more processors are further configured to:
 receive configuration information indicating a plurality of PRT sequences associated with a plurality of bandwidth parts, wherein the plurality of bandwidth parts includes the second bandwidth part, and wherein the PRT allocation for the second bandwidth part is based at least in part on a PRT sequence, of the plurality of PRT sequences, associated with the second bandwidth part.

14. An apparatus for wireless communication at a base station, comprising:
 a memory; and
 one or more processors, coupled to the memory, configured to:
  cause a user equipment (UE) to switch from a first bandwidth part to a second bandwidth part associated with a peak reduction tone (PRT) allocation; and
  receive a signal from the UE including one or more PRTs in one or more locations defined by the PRT allocation.

15. The apparatus of claim 14, wherein the one or more processors are further configured to:
 transmit downlink control information indicating the PRT allocation for the second bandwidth part.

16. The apparatus of claim 15, wherein the downlink control information is first downlink control information, and wherein the one or more processors are further configured to:
 transmit second downlink control information indicating to switch from the first bandwidth part to the second bandwidth part.

17. The apparatus of claim 14, wherein the one or more processors are further configured to:
 configure a PRT sequence for an operating band of the UE, wherein determining the PRT allocation is based at least in part on the PRT sequence.

18. The apparatus of claim 17, wherein the PRT sequence spans an entirety of the operating band.

19. The apparatus of claim 17, wherein the PRT allocation is based at least in part on a set of PRT indices, identified by the PRT sequence, that are included in a bandwidth of the second bandwidth part.

20. The apparatus of claim 14, wherein the PRT allocation is based at least in part on a PRT sequence that is shifted to a frequency associated with the second bandwidth part.

21. The apparatus of claim 20, wherein the one or more processors are further configured to:
 configure the PRT sequence via radio resource control signaling or medium access control signaling prior to the UE switching from the first bandwidth part to the second bandwidth part.

22. The apparatus of claim 20, wherein the PRT sequence is shifted to a first tone or a first resource block of the second bandwidth part.

23. The apparatus of claim 22, wherein one or more PRT indices, identified by the PRT sequence, are outside of a bandwidth of the second bandwidth part, and wherein the PRT allocation for the second bandwidth part excludes the one or more PRT indices.

24. The apparatus of claim 14, wherein the one or more processors are further configured to:
 transmit configuration information indicating a plurality of PRT sequences associated with a plurality of bandwidth parts, wherein the plurality of bandwidth parts includes the second bandwidth part, and wherein the PRT allocation for the second bandwidth part is based at least in part on a PRT sequence, of the plurality of PRT sequences, associated with the second bandwidth part.

25. A method of wireless communication performed by an apparatus of a user equipment (UE), comprising:
 switching from a first bandwidth part to a second bandwidth part; and
 transmitting a signal including one or more peak reduction tones (PRTs) in one or more locations defined by a PRT allocation for the second bandwidth part.

26. The method of claim 25, further comprising:
receiving downlink control information indicating to switch to the second bandwidth part.

27. The method of claim 26, further comprising:
determining the PRT allocation based at least in part on the downlink control information.

28. A method of wireless communication performed by a base station, comprising:
causing a user equipment (UE) to switch from a first bandwidth part to a second bandwidth part associated with a peak reduction tone (PRT) allocation; and
receiving a signal from the UE including one or more PRTs in one or more locations defined by the PRT allocation.

29. The method of claim 28, further comprising:
transmitting downlink control information indicating the PRT allocation for the second bandwidth part.

30. The method of claim 29, wherein the downlink control information is first downlink control information, and wherein the method further comprises:
transmitting second downlink control information indicating to switch from the first bandwidth part to the second bandwidth part.

* * * * *